United States Patent [19]
Szuminski et al.

[11] Patent Number: 4,502,639
[45] Date of Patent: Mar. 5, 1985

[54] TURBOMACHINE EJECTOR NOZZLE

[75] Inventors: Gary F. Szuminski, Marietta; Douglas J. Nightingale, Atlanta, both of Ga.

[73] Assignee: Rolls-Royce Inc., New York, N.Y.

[21] Appl. No.: 372,016

[22] Filed: Apr. 26, 1982

[51] Int. Cl.³ .............................. F02K 1/12; F02K 1/38
[52] U.S. Cl. .............................. 239/265.31; 239/265.41
[58] Field of Search ....................... 239/265.17, 265.19, 239/265.23, 265.33, 265.37, 265.41; 244/12.5, 23 D; 60/226.1, 226.2, 271, 229

[56] References Cited
U.S. PATENT DOCUMENTS

| 2,849,861 | 9/1958 | Gardiner et al. | |
| 2,972,226 | 2/1961 | Geary. | |
| 3,403,858 | 10/1968 | Kurti et al. | |
| 3,587,973 | 6/1971 | Wolf. | |
| 3,610,533 | 10/1971 | Johnson et al. | 239/265.19 |
| 3,747,855 | 7/1973 | Vdoviak et al. | 239/265.29 |

FOREIGN PATENT DOCUMENTS

| 2711217 | 9/1977 | Fed. Rep. of Germany. |
| 2096538 | 2/1972 | France. |
| 2153146 | 5/1973 | France. |
| 636296 | 4/1950 | United Kingdom. |
| 833250 | 4/1960 | United Kingdom. |
| 1200691 | 7/1970 | United Kingdom. |
| 1438677 | 6/1976 | United Kingdom. |
| 1493504 | 11/1977 | United Kingdom. |

Primary Examiner—Andres Kashnikow
Attorney, Agent, or Firm—Cushman, Darby & Cushman

[57] ABSTRACT

An exhaust nozzle for a gas turbine aero-engine comprising a duct 17(c), a plurality of movable flaps 38,43 for varying the geometry of the nozzle, one or more forwardly and outwardly directed openings 59 located upstream of the flaps 38,43 and a pair of mutually confronting doors 61 each of which is mounted for rotation about an axis extending transverse to the length of the duct 17(c). The doors 61 are located relative to the duct 17(c) and the openings 59 so that, in a first position, they obturate the openings 59 and mutually confronting surfaces 67 of the doors define therebetween part of the gas flow path through the nozzle, and the doors 61 are movable to a second position, upstream of the first position, where they uncover the openings 59, define, at their upstream ends 68, a reduced area throat for the gas flow path through the nozzle. In the second position the doors 61 also define a divergent part of the gas flow path immediately downstream of the said throat. The reduced pressure downstream of the throat induces ambient air through the openings 59 into the gas flow path through the nozzle. Means 28,35,36 are provided for moving the flaps 38,43 to accommodate the increased gas flow through the nozzle when the said openings 59 are uncovered. In this way the infrared emission of the gas plume exiting from the nozzle is suppressed by the cool air.

10 Claims, 5 Drawing Figures

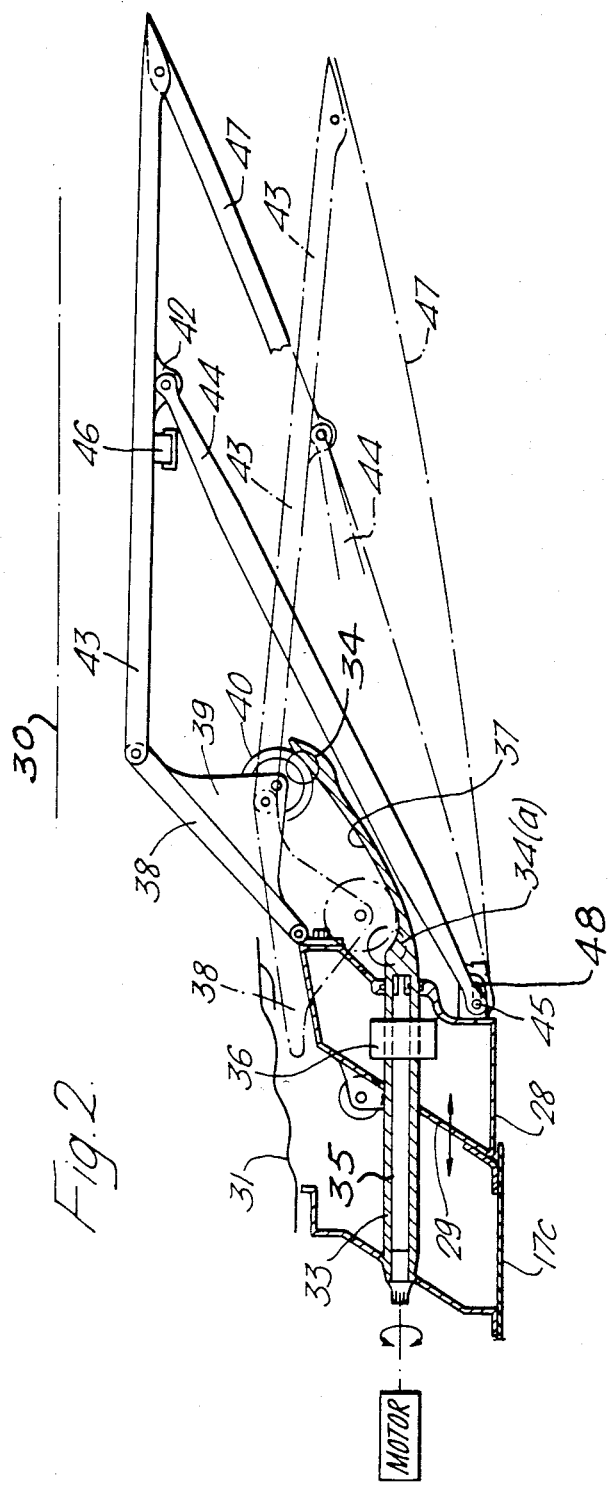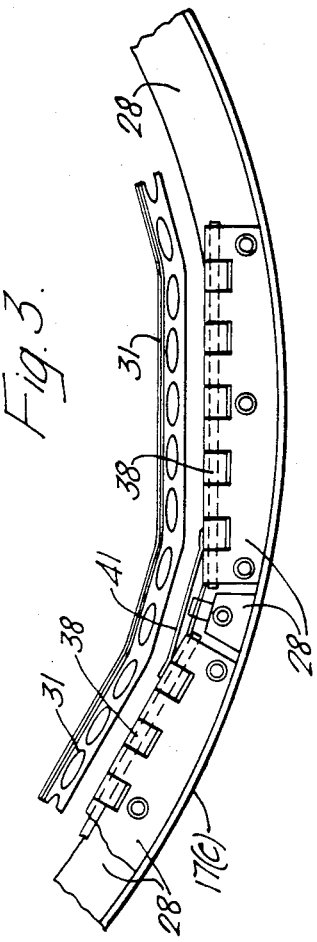

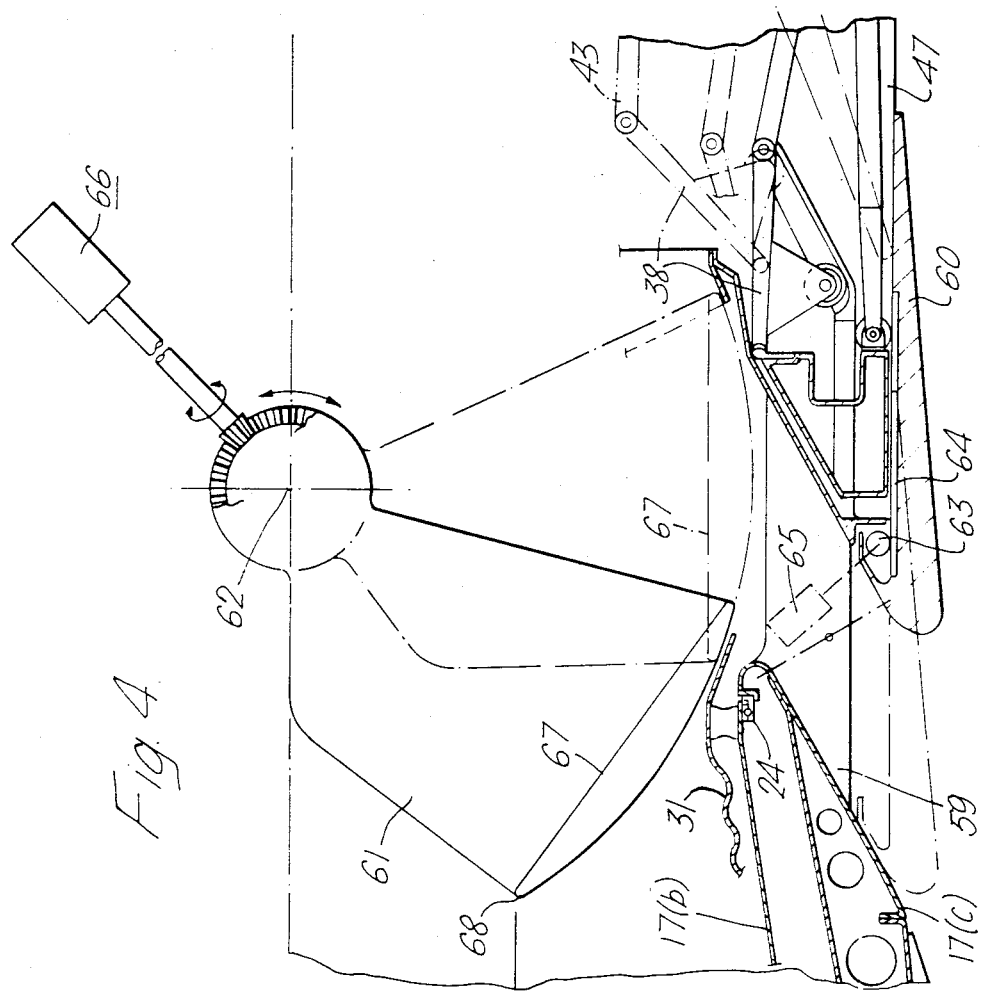

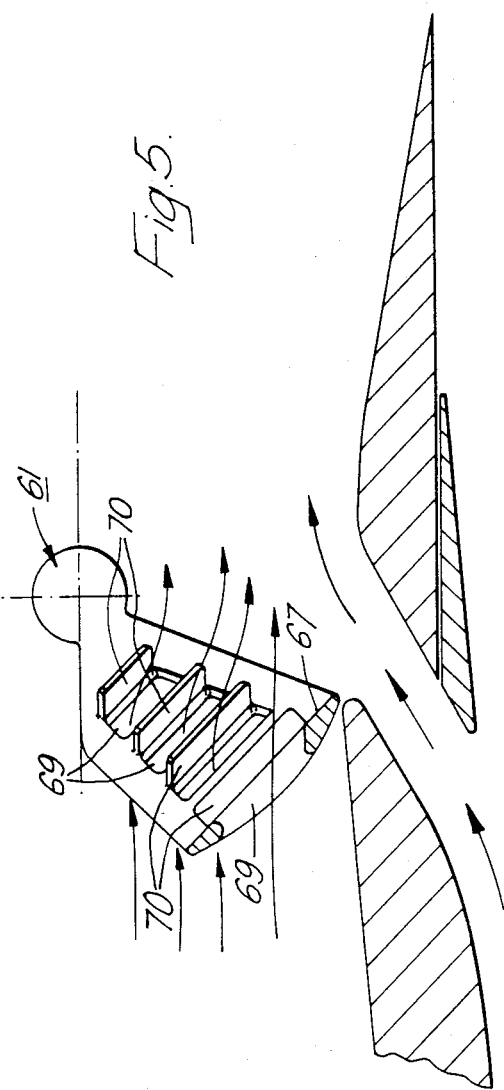

4,502,639

TURBOMACHINE EJECTOR NOZZLE

This invention relates to nozzles for gas turbine aero-engines and is particularly concerned with variable geometry nozzles and the suppression of the infra red radiation emitted by the hot exhaust plume of such engines.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as reheat or afterburning. During reheat it is necessary to increase the area of the nozzle to accommodate the increased volume of gases so as not to impair the efficient functioning of the engine. In other roles such as supersonic cruise, it is desirable to vary the geometry of the exhaust nozzle of the engine from a convergent geometry for subsonic speed to a configuration having an increased area throat (compared to that required during the "dry" mode or at subsonic cruise) formed between a convergent and divergent part of the nozzle—often referred to as a con-di nozzle.

There are times during the flight envelope of an aircraft when reheat is not required and when the prime requisite is to reduce the infra red emission of the exhaust plume and thereby reduce or avoid detection by heat seeking missiles directed towards the aircraft. These missiles usually detect the infra red radiation of the hot exhaust gas plume and once the plume is located home in on the hot parts of the engine to destroy the aircraft.

There is a need for a nozzle design that not only caters for dry and reheat modes of operation, but also enables one selectively to reduce the infra-red emission of the engine.

An object of the present invention is to provide a variable geometry nozzle which is capable of use both in the dry and reheat modes of operation and also capable of reducing the infra red emission of the hot exhaust gas plume.

The invention as claimed enables one to vary the geometry of the nozzle to cope with dry and reheat modes of operation by moving the flaps and enables one to reduce the infra red emission by opening additional air inlets which admit ambient air to cool and shield the hot exhaust plume.

The nozzle of the present invention may be installed on a fixed jet pipe or on a vectorable jet pipe. Furthermore, the nozzle of the present invention may be installed on the vectorable front nozzles of an engine such as the Rolls-Royce Limited Pegasus engine which discharge cold or reheated by-pass air.

The invention will now be described, by way of an example, with reference to the accompanying drawings in which:

FIG. 2 illustrates in more detail a sectional elevation of part of the rear nozzle of the engine shown in FIG. 1, FIG. 3 shows in greater detail part of the set of first flaps of the nozzle of FIG. 2, FIG. 4 shows in greater detail the ejector nozzle constructed in accordance with the present invention, and, FIG. 5 shows a modification to the clamshell doors of the nozzle shown in FIG. 4.

Figure 1:
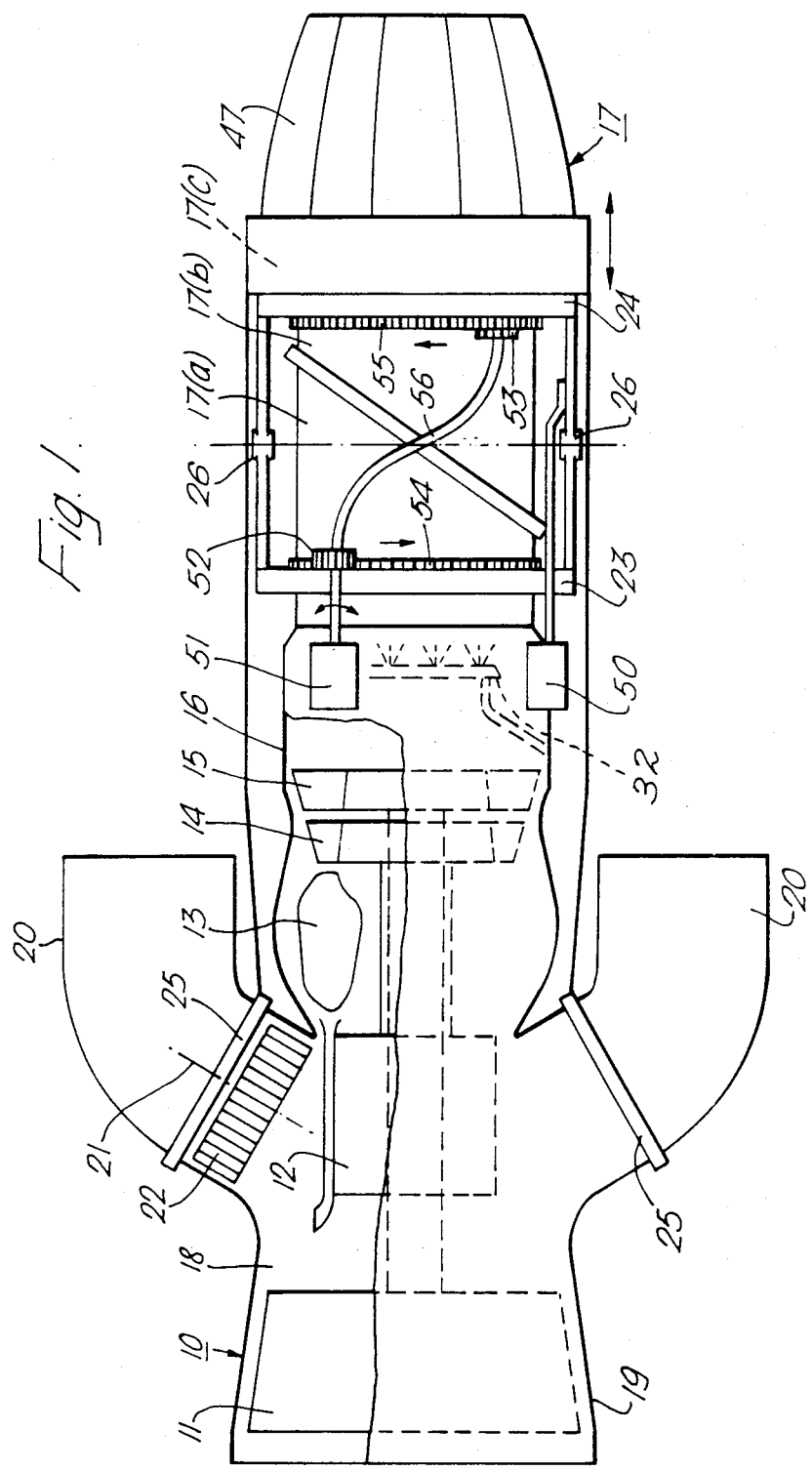
FIG. 1 illustrates schematically a gas turbine aero-engine incorporating three vectorable nozzles. For convenience only one of the nozzles is shown constructed in accordance with the present invention.

Referring to FIG. 1 there is shown schematically a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable variable area nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 25 for rotation through an angle of approximately 110° about an axis 21.

Additional combustion equipment 22 is provided in the plenum chamber 18 so that additional fuel can be burnt in the air stream ejected through the nozzles 20 to increase the thrust. To enable the engine to run efficiently the nozzles 17 and 20 are provided with variable-area, variable-geometry outlets and are constructed in accordance with the present invention.

For convenience the invention will be more particularly described with reference to nozzle 17 but it is to be understood that the mechanism for varying the area and geometry is similar for all the nozzles 17 and 20, and may also be used with nozzles for fixed jet pipes.

The nozzle 17 is of the type in which a scarfed rotatable duct 17(a) is mounted in bearings 23 on the downstream end of the jet pipe 16, and a second scarfed duct 17(b) is mounted in bearings 24 for rotation in the opposite direction to that of duct 17(a). The bearing 24 is, in turn, rotatable bodily on trunnions 26 which extend transverse to the axis of duct 17(b). This type of nozzle is described in more detail in co-pending U.S. patent application No. 376,388 entitled Vectorable Nozzles for Turbomachines naming Gary Frank Szuminski and Thomas John Jones as the inventors. In operation the bearing 24 is rotated about the axis of the trunnions 26 by means of a screw jack (shown schematically by the numeral 50) which pushes on the brackets that support the bearing 24 in the trunnions 26. As the bearing 24 is swung about the axis of the trunnions 26 the ducts 17(a) and 17(b) are rotated in opposite directions by means of a motor 51 and sprockets 52,53, chain drives 54,55 and flexible drive shaft 56 as explained in the above-mentioned U.S. patent application.

The nozzle 17 has at its downstream end a duct 17(c) which is carried by the fixed race of the bearing. It is this duct 17(c) that is provided with the mechanism for varying the geometry and area of the outlet of the nozzle 17 in accordance with the present invention, as shown in FIGS. 2 and 3.

Referring to FIGS. 2 and 3, the mechanism for varying the geometry and area of the outlet nozzle comprises an annular member 28 which is translatable axially and on which is carried three sets of flaps as will be described below. The member 28 is mounted to slide axially inside the downstream end duct 17(c) and the member 28 comprises an annular hollow box structure which has a face 29 extending in a direction transverse to the axis 30 of the duct 17(c). Pressurised gas flowing through duct 17(c) acts on face 29 to urge the member 28 rearwards.

The member 28 slides inside the bore of the duct 17(c) and a heat shield liner 31 is provided to protect the duct 17(c) and the member 28 from the hot gases flowing through the nozzle when the reheat combustor 32 in the jet pipe is ignited.

The member 28 is supported on axially extending tubes 33 which carry an annular cam-ring assembly 34.

Located in at least some of the tubes 33 is a lead screw 35 of a screwjack which engages a nut 36 (of the recirculating ball type) fixed to the member 28. Rotation of the lead screws 35 by a motor drive through gearboxes pushes and pulls the member 28 to- and fro in the axial direction.

The cam ring assembly 34 comprises two polygonal frameworks of tubes 34(a) interconnected by which a plurality of cams 37 facing inwards (only one of which is shown). The cams 37 are equispaced around the axis 30.

A set of first primary flaps 38 is pivotally attached to the member 28. Each first primary flap 38 is pivotally attached at its upstream end to the downstream inner circumferential end of the member 28 and has a web 39 projecting from its outer facing side. The web 39 carries a cam follower 40, in the form of a roller, that engages one of the cams 37 to define and vary the attitude of the flap 38 relative to member 28 as member 28 is moved in axial directions.

The flaps 38 comprise a hollow structure with spaced walls which are made from a carbon-carbon material such as Pyrocarb (Registered US Trade Mark) material as manufactured by Hitco of USA). Pyrocarb materials comprise a carbon matrix in which is embedded a woven cloth of carbon fibres. The material is projected from oxidation either by overcoating it with a non-oxidising protective layer or by impregnating silicon into it and converting the silicon or silicon carbide.

A second primary flap 43 is pivotally attached at its upstream end to the downstream end of each first primary flap 38. Each flap 43 is a hollow structure of spaced carbon-carbon walls similar to flaps 38, and each flap 43 is provided with a lug 42 partway along its length.

The flaps 38 are spaced apart circumferentially and each of the gaps between the flaps 38 is closed off by this seal plate 41 (see FIG. 3 which is a section through the hinge between flaps 38 and the member 28). The seal plates 41 are located on the inward-facing side of the flaps 38 and are constrained from falling inwards by means of rollers 46 that engage the outside surface of the flaps 43. The seal plates 41 accommodate different positions of the flaps 38 by sliding circumferentially.

A plurality of struts 44 are pivotally attached at one of their ends to a downstream outer circumference of the member 28. Each of the struts 44 is pivotally connected at its outer end to the lug 42 of one of the second flaps 38.

Here again, the second flaps 43 are spaced circumferentially and the gaps between them are closed-off by thin carbon-carbon seal plates 45 that are pivotally attached at their upstream end to the downstream end of the seal plates 41. The seal plates 45 are located on the inward-facing side of the flaps 43 and are constrained from falling inwards by rollers 46 which are mounted on flanges that project through the gaps between flaps 43 to engage the outer surface of the flaps 43. The seal plates 45 allow the flaps 43 to assume different positions where they define a convergent part of the nozzle to where they define a divergent part of the nozzle by sliding relative to the flaps 43. The seal plates 45 do not have lugs 42 and no struts 44 are connected to the seal plates 45.

A set of third flaps 47 made of a carbon fibre reinforced polyimide material are provided on the member 28. Each of the third flaps 47 is pivotally attached at their upstream end to the downstream end of the member 28, and are pivotally attached at their downstream ends to the downstream end of one of the second flaps 38. The pivot 45 at the upstream end of the third flaps 47 locates in an elongated hole 48 in the member 28.

The flaps 47 overlap each other to accommodate the different positions of the flaps 47.

In operation of the nozzle with the member 28 in the fully rearwards position shown in solid lines in FIG. 2, the flaps 38 define a convergent part of the nozzle and the flaps 43 define a parallel or slightly divergent part of the nozzle with the throat area of the nozzle (in a radial plane of the pivotal connections between the flaps 38 and 43) at a minimum dimension. This configuration would be used for a subsonic dry maximum thrust mode of operation such as for take-off, or subsonic accelerations.

By pulling the member 28 forwards the cam followers 40 move along the cams 37 and the flaps 38 define a parallel or slightly convergent part of the nozzle (as shown with dotted lines) a maximum area throat, and flaps 43 define a divergent part of the nozzle with a maximum area exit at the downstream ends of flaps 43. This configuration would be used for maximum thrust with reheat or P.C.B. mode of operation.

As flaps 38 and 43 take up different positions the seal plates 41 and 45 slide to fill up the gaps between the respective flaps 38 and 43. Also, the flaps 37 are moved to alter the boat-tail angle and thereby reduce base drag.

The gas loads on the flaps 38 and 43 and seal plates 41 and 45 are transmitted back to the member 28 and exert a net force forwards (i.e. towards the jet pipe 16) on the member 28. Accordingly, by exposing the front face of the member 28 to the pressurised gases flowing through the duct 17(c) the gases exert a rearward force on the member 28 that partly counterbalances the forward loads exerted on the member 28. This in turn reduces the forces required to move the member 28 in axial directions. The area of the front face 29 of the member can be chosen to achieve the optimum rearwards force on the member 28.

Clearly, at intermediate positions between those shown in solid and dotted lines in FIG. 2 various combinations of convergence and divergence with different throat areas can be obtained.

Referring to FIG. 4 the duct 17(c) is provided with forwardly directed openings 59 spaced around its circumference. An axially translatable hollow cylindrical cover door 60 is provided to obturate the outer extremity of all the openings 59. A pair of frustohemispherical hollow clamshell doors 61 which pivot about a transverse axis 62 of the duct 17(c), is provided upstream of the flaps 38 to close off the inner extremities of the openings 59 when the doors 61 are in a stowed position (shown in dotted lines).

When in the stowed position, the confronting surfaces 67 of the doors 61 define therebetween part of the gas flow path through the nozzle 17. A motor 66 is provided to rotate the doors 61 in a forwards direction about the axis 62 from the stowed position to a second position (ejector position) upstream of the openings 59. By moving the doors 61 to the ejector position, they uncover the openings 59 and simultaneously the front edges 68 of the doors form a dam that defines a reduced area throat for the gas flow through the nozzle immediately upstream of the openings 59. The confronting surfaces 67 of the doors also define a divergent part of a primary nozzle immediately downstream of this reduced area throat. The resulting depression caused by the flow of gases downstream of the throat induces ambient air to flow into the nozzle through the openings 59 to cool and shield the hot gas plume emitted by the nozzle.

When the doors 61 are deployed in the ejector position the member 28 is moved rearwards to move the flap 38 and thereby to increase the area of the throat of the secondary nozzle formed by the flaps 38 and 43 to cope with the increased air flow due to the ambient air induced to flow through the openings 59. It will be seen that with the doors stowed, the effective nozzle for the engine is that defined by the flaps 38 but when the doors are in the ejector position the nozzle controlling the thermodynamic cycle of the engine is that formed by the doors 61.

The cover door 60 is supported concentrically relative to the bearing 24 by means of eight circumferentially spaced pinion gears 63 which engage racks 64 on the inside circumference of the cover door 60. The gears 63 are driven by means of a motor 65 which drives all the gears 63 via gearboxes and drive shafts (not shown) so that they rotate in unison to move the door 60 axially to open and close the outer extremities of the openings 59.

The drive to the gears 63 is synchronised with the drive to the clamshell doors 61 so that the door 60 is moved to open the openings 59 only when the clamshell doors 61 are moved to the ejector position. In addition the drive to the mechanism that moves the member axially to vary the geometry of the nozzle is synchronised so that when the clamshell doors 61 are moved to the ejector position the flaps 38 are moved to increase the throat area defined by the flaps 38.

It cannot be stressed too strongly, that although the nozzle described above has been described in connection with a vectorable nozzle, the present invention is eminently suitable for use at the downstream end of a fixed jet pipe.

Referring to FIG. 5, the throat area defined by the up stream edges 68 of the doors 61 can be supplemented or modified to enhance ambient ejector air flow and mixing potential by providing openings 69 in each of the doors 61, the openings 69 are covered by shutters 70 on the inward facing face 67 of each door 61. These shutters are constructed to blow open when the doors 61 are in the ejector position and are held closed in the stowed position by the pressure of the gases acting on the shutters 70. Alternatively, the shutters 70 could be opened or closed by mechanical means.

We claim:

1. An exhaust nozzle for a gas turbine aero-engine comprising a duct, a plurality of movable flaps for varying the geometry of the nozzle, at least two forwardly and outwardly directed openings located upstream of the flaps, and a pair of mutually confronting doors each of which is mounted for rotation about an axis extending transverse to the length of the duct, wherein the doors are located relative to the duct and the openings so that, in a first position, they obturate the openings and mutually confronting surfaces of the doors define therebetween part of the gas flow path through the nozzle, the doors being movable to a second position, upstream of the first position, where they uncover the openings, define, at their upstream ends, a reduced area throat for the gas flow path through the nozzle, and also define a divergent part of the gas flow path immediately downstream of the said throat thereby to reduce the pressure downstream of the throat to induce ambient air through the openings into the gas flow path through the nozzle, and means are provided for moving the flaps to accommodate the increased gas flow through the nozzle when the said openings are uncovered.

2. An exhaust nozzle according to claim 1 wherein a second door means is provided to obturate an outer extremity of said openings.

3. An exhaust nozzle according to claim 1 wherein the means for moving the flaps comprises a member movable in a direction extending along the length of the duct and the flaps are pivotally mounted at their upstream end to the member.

4. A nozzle according to claim 3 wherein the translatable member is mounted to slide on axially extending supports and the supports carry an annular framework that defines a plurality of axially extending cam surfaces spaced around the axis of the annular framework.

5. A nozzle according to claim 4 wherein the cam surfaces face inwards and each flap is provided, on its outer facing side, with the cam follower that co-operates with one of the cam surfaces.

6. An exhaust nozzle according to claim 3 wherein the flaps comprise an axisymmetric array of first flaps and there is further provided an axisymmetric array of second flaps each of which is pivotally mounted at its upstream end to the downstream end of one of the first flaps, and constraining means are provided for constraining the second flaps to assume a divergent position relative to the duct in at least one position of the second flaps.

7. An exhaust nozzle according to claim 6 wherein the constraining means comprises a plurality of struts each of which is pivotally attached at one end to the axially translating member and is pivotally attached at its other end to one of the second flaps.

8. An exhaust nozzle according to claim 6 wherein an axisymmetric array of third flaps are provided, each of the third flaps being pivotally connected at their downstream end to the downstream end of a second flap and being mounted at its upstream end on the said axially translating member.

9. A nozzle according to claim 8 wherein the axially translatable member is a right circular cylindrical annular structure and the first flaps are pivotally mounted on an inner circumference of the annular member, and the third flaps are pivotally mounted on an outer circumference of the member.

10. An exhaust nozzle according to claim 1 wherein the doors have openings in them which are covered by shutters which are opened when the doors are in the second position and are held closed when the doors are in the first position.

* * * * *